US009105037B2

(12) United States Patent
Kim et al.

(10) Patent No.: US 9,105,037 B2
(45) Date of Patent: Aug. 11, 2015

(54) METHOD AND SYSTEM FOR LEASING OF NETWORK SERVICES AND APPLICATIONS BASED ON A USAGE PATTERN

(75) Inventors: Yongbum Kim, Cupertino, CA (US); Bruce Currivan, Dove Canyon, CA (US); Wael William Diab, San Francisco, CA (US); Jeyhan Karaoguz, Irvine, CA (US); Kenneth Ma, Cupertino, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 320 days.

(21) Appl. No.: 13/614,418

(22) Filed: Sep. 13, 2012

(65) Prior Publication Data

US 2013/0013782 A1    Jan. 10, 2013

Related U.S. Application Data

(63) Continuation of application No. 12/775,083, filed on May 6, 2010, now Pat. No. 8,380,836.

(60) Provisional application No. 61/228,358, filed on Jul. 24, 2009.

(51) Int. Cl.
*H04L 12/24* (2006.01)
*H04W 8/18* (2009.01)
*G06Q 30/02* (2012.01)
*G06Q 30/04* (2012.01)
*H04L 29/08* (2006.01)

(52) U.S. Cl.
CPC .............. *G06Q 30/02* (2013.01); *G06Q 30/04* (2013.01); *H04L 41/5058* (2013.01); *H04L 41/5096* (2013.01); *H04L 67/125* (2013.01); *H04L 67/303* (2013.01); *H04L 67/306* (2013.01); *H04W 8/18* (2013.01); *H04W 8/183* (2013.01)

(58) Field of Classification Search
CPC ................................. H04W 8/18; H04W 8/183
USPC ........... 709/223, 224, 226; 455/405, 406, 407
See application file for complete search history.

(56) References Cited

U.S. PATENT DOCUMENTS

| 6,108,316 A | 8/2000 | Agrawal et al. ............... 370/311 |
| 2002/0069037 A1 | 6/2002 | Hendrickson ................. 702/186 |

(Continued)

FOREIGN PATENT DOCUMENTS

| EP | 1 398 985 A2 | 3/2004 | ............... H04Q 7/36 |
| WO | WO 00/07384 A2 | 2/2000 | ............... H04Q 7/00 |

OTHER PUBLICATIONS

European Patent Office, Communication with European Search Report in Application No. Sep. 24, 2010, 6 pages.

*Primary Examiner* — Asghar Bilgrami
(74) *Attorney, Agent, or Firm* — Brinks Gilson & Lione

(57) ABSTRACT

Aspects of a method and system for predictive leasing of network services and applications based on a usage pattern may comprise a management entity that coordinates operation of one or more endpoint devices. A user profile associated with the one or more endpoint devices may be received by the management entity, wherein the management entity may utilize the user profile associated with the one or more endpoint devices and a usage pattern associated with the one or more endpoint devices to determine leasing information for the one or more endpoint devices. The management entity may be operable to communicate the determined leasing information to the one or more endpoint devices. The leasing information may comprise leasing services and/or applications to the one or more endpoint devices.

20 Claims, 7 Drawing Sheets

(56) References Cited

U.S. PATENT DOCUMENTS

| | | | |
|---|---|---|---|
| 2004/0085909 A1 | 5/2004 | Soliman | 370/252 |
| 2009/0164287 A1* | 6/2009 | Kies et al. | 705/8 |
| 2009/0187659 A1 | 7/2009 | Savoure | 709/226 |
| 2010/0188990 A1* | 7/2010 | Raleigh | 370/252 |
| 2010/0191613 A1* | 7/2010 | Raleigh | 705/26 |
| 2011/0019626 A1 | 1/2011 | Karaoguz et al. | 370/329 |
| 2011/0022713 A1 | 1/2011 | Kim et al. | 709/226 |

* cited by examiner

METHOD AND SYSTEM FOR LEASING OF NETWORK SERVICES AND APPLICATIONS BASED ON A USAGE PATTERN

CROSS REFERENCE TO RELATED APPLICATIONS

This application is a continuation of U.S. patent application Ser. No. 12/775,083, filed May 6, 2010, pending, which claims priority to and claims benefit of U.S. Provisional Application Ser. No. 61/228,358, filed Jul. 24, 2009, expired. These related applications are hereby incorporated in their entirety herein by this reference.

TECHNICAL FIELD

Certain embodiments of the invention relate to communications. More specifically, certain embodiments of the invention relate to a method and system for predictive leasing of network services and applications based on a usage pattern.

BACKGROUND

Electronic communication networks are becoming an increasingly popular means of exchanging data of various types, sizes for a variety of applications and business and consumers alike want network access on more and more devices. Moreover, consumers and business continually want faster network access and/or greater bandwidth on all of their communication devices. Consequently, as more and more devices are being equipped to access communication networks, network administrators and service providers are presented with the challenge of effectively serving an increasing number of devices having and increasingly diverse set of capabilities utilizing an increasing diverse collection of protocols, software, and/or other networking and computing resources.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for predictive leasing of network services and applications based on a usage pattern, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Certain embodiments of the invention may be found in a method and system for leasing of network services and applications based on a usage pattern. In various embodiments of the invention, a communication system may comprise a management entity that coordinates operation of one or more endpoint devices. A user profile associated with the one or more endpoint devices may be received by the management entity, wherein the management entity may utilize the received user profile and a usage pattern associated with the one or more endpoint devices to determine leasing information for the one or more endpoint devices. The leasing information may comprise information regarding leasing one or more applications and/or services to the one or more endpoint devices.

Figure 1A:
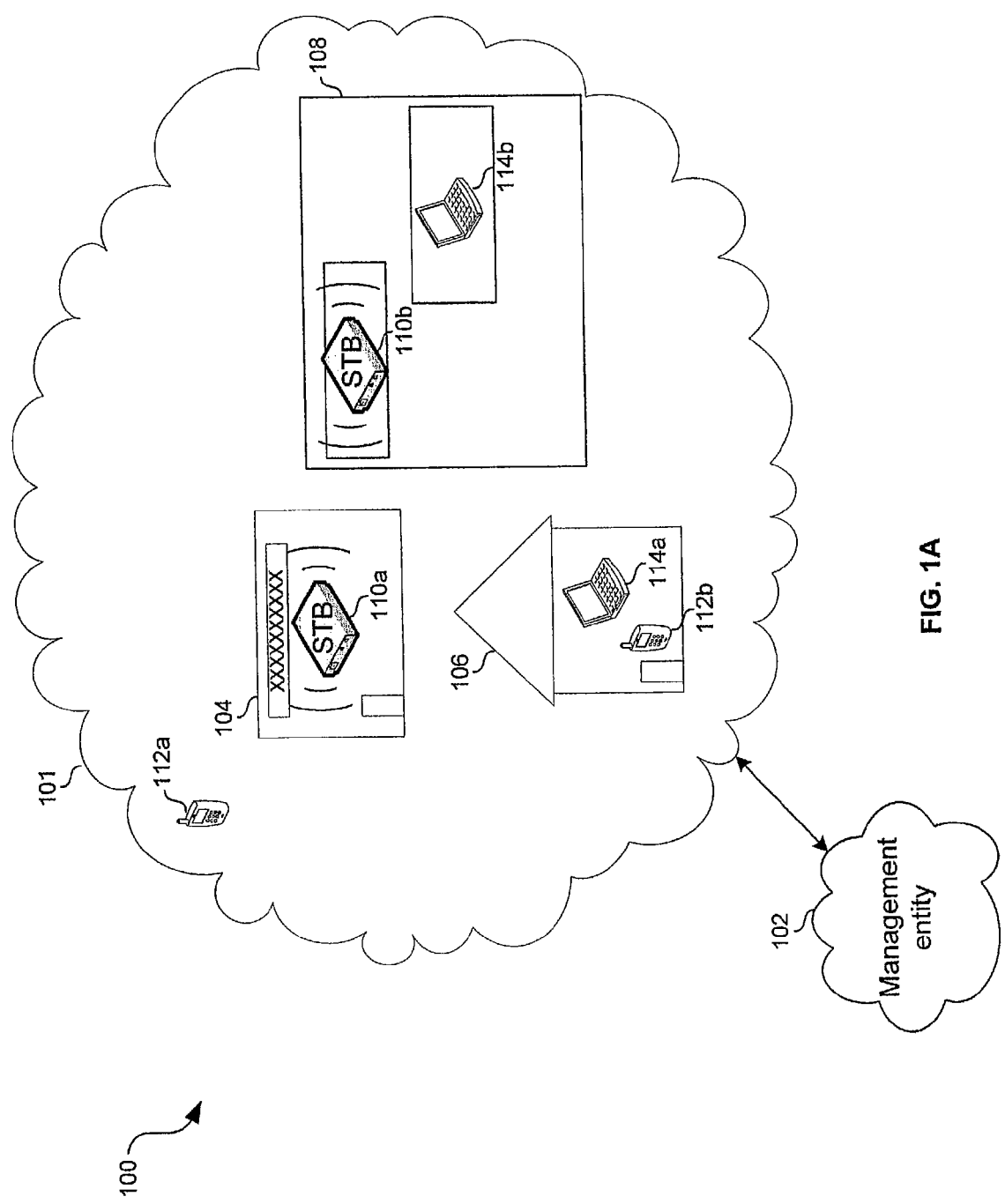
FIG. 1A is a diagram illustrating a system for leasing of network services and applications based on a usage pattern, in accordance with an embodiment of the invention.

FIG. 1A is a diagram illustrating a system for leasing of network services and applications based on a usage pattern, in accordance with an embodiment of the invention. Referring to FIG. 1A, there is shown a communication system 100 comprising a sub-network 101, and a management entity 102. The exemplary sub-network 101 may comprise a plurality of endpoint devices. Exemplary endpoint devices may comprise media players, HD television systems, video and/or still cameras, game consoles, set-top boxes (STBs), cell phones, laptops, televisions sets, display devices and/or location determination enabled devices. For example, the sub-network 101 may comprise a plurality of STBs 110a and 110b, which are collectively referred to herein as STBs 110, a plurality of cell phones 112a and 112b, which are collectively referred to herein as cell phones 112, and a plurality of laptops 114a and 114b, which are collectively referred to herein as laptops 114. The STB 110a may be installed in one or more commercial properties 104, the STB 110b and laptop 114b may be installed in one or more residential properties 106, the laptop 114a and the cell phone 112b may be located in one or more multi-tenant properties 108, and/or the cell phone 112a may be located within the sub-network 101. Notwithstanding, the invention may not be so limited and the plurality of endpoint devices may be located and/or installed in any other location, for example, an office without departing from the scope of the invention.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The management entity 102 may comprise suitable logic, circuitry, interfaces and/or code for managing user profiles of one more endpoint devices, for example, the STB 110b, the cell phone 112b, and/or the laptop 114b. The cell phones 112 and the laptops 114 may each comprise suitable logic, circuitry, interfaces and/or code that may be operable to communicate wirelessly utilizing one or more wireless standards such as IS-95, CDMA, EVDO, GSM, TDMA, GPRS, EDGE, UMTS/WCDMA, TD-SCDMA, HSPA (HSUPA and/or HSDPA), WIMAX and/or LTE. The cell phones 112 and the laptops 114 may be operable to communicate based on Bluetooth, Zigbee and/or other suitable wireless technologies. The management entity 102 may be operable to provide access to the Internet and/or one or more private networks via one or more of optical, wired, and/or wireless connections. In various embodiments of the invention, the optical, wired, and/or wireless connections may comprise a broadband connection such as a digital subscriber line (DSL), Ethernet, passive optical network (PON), a T1/E1 line, a cable television infrastructure, a satellite television infrastructure, and/or a satellite broadband Internet connection.

The STBs 110 may comprise suitable logic, circuitry, interfaces and/or code that may be operable to connect to a display device, for example, a television set and an external source of signal from the management entity 102. The STBs 110 may be operable to convert the received signal from the management entity 102 to content, which may be displayed on a display device, for example, a television set. The STBs 110 may be operable to provide Internet connectivity, multimedia downloads and/or IP telephony sessions.

The cell phones 112 and/or laptops 114 may each comprise suitable logic, circuitry, interfaces, and/or code that may be operable to communicate utilizing one or more cellular standards. The cell phones 112 and/or laptops 114 may be operable to receive, process, and present multimedia content and may additionally be enabled run a network browser or other applications for providing Internet services to a user of the cell phones 112 and/or laptops 114.

In operation, the management entity 102 may be operable to coordinate operation of one or more endpoint devices, for example, the STBs 110, the cell phones 112, and/or the laptops 114. One or more user profiles corresponding to one or more endpoint devices, for example, the STBs 110, the cell phones 112, and/or the laptops 114 may be received by the management entity 102. The management entity 102 may be operable to utilize the one or more user profiles associated with the one or more endpoint devices, for example, the STBs 110, the cell phones 112, and/or the laptops 114 and the usage pattern associated with the one or more endpoint devices, for example, the STBs 110, the cell phones 112, and/or the laptops 114 to determine leasing information for the one or more endpoint devices, for example, the STBs 110, the cell phones 112, and/or the laptops 114. The management entity 102 may be operable to communicate the determined leasing information to the one or more endpoint devices, for example, the STBs 110, the cell phones 112, and/or the laptops 114.

The one or more endpoint devices, for example, the STBs 110, the cell phones 112, and/or the laptops 114 may be operable to configure themselves based on receiving from the management entity 102, the determined leasing information for each of the one or more endpoint devices, for example, the STBs 110, the cell phones 112, and/or the laptops 114. The determined leasing information may comprise a time period for downloading one or more of the applications previously leased by the one or more endpoint devices, for example, the STBs 110, the cell phones 112, and/or the laptops 114. The determined leasing information may also comprise a time period for leasing one or more of the services previously leased by the one or more endpoint devices, for example, the STBs 110, the cell phones 112, and/or the laptops 114. For example, when an endpoint device, for example, cell phone 112a is at a particular GNSS location, the management entity 102 may be operable to download the applications and/or services leased from the management entity 102 to the cell phone 112a at a pre-determined time period for leasing the applications and/or based on the received user profile from the cell phone 112a.

Figure 1B:
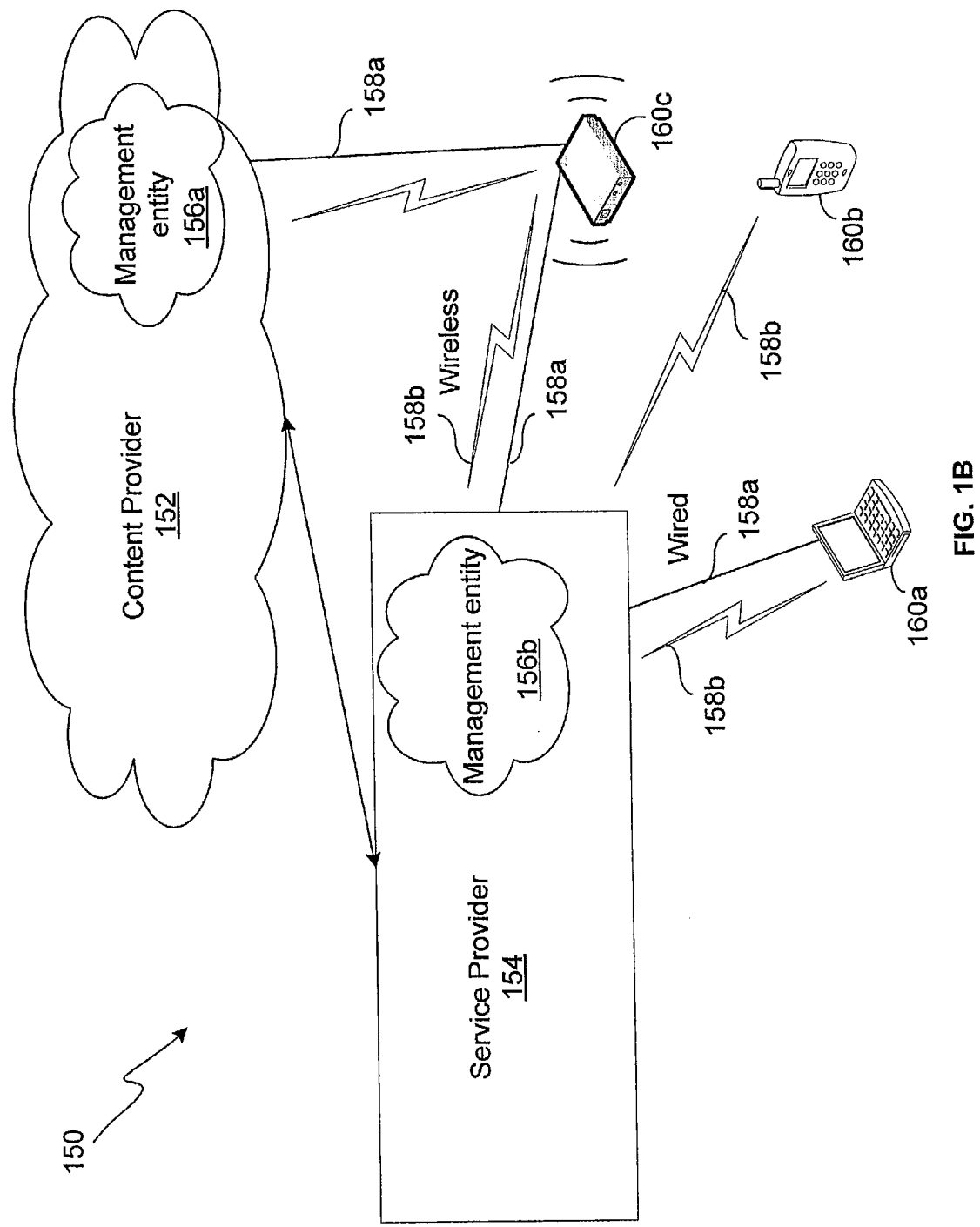
FIG. 1B is a diagram illustrating a system for leasing of network services and applications comprising a service provider and a content provider, in accordance with an embodiment of the invention.

FIG. 1B is a diagram illustrating a system for leasing of network services and applications based on a usage pattern comprising a service provider and a content provider, in accordance with an embodiment of the invention. Referring to FIG. 1B, there is shown a communication system 150. The communication system 150 may comprise a content provider 152, a service provider 154, wired 158a and/or wireless connections 158b, and a plurality of endpoint devices, for example, a laptop 160a, a cell phone 160b, and a set-top box (STB) 160c. The content provider 152 may comprise a management entity 156a and the service provider 154 may comprise a management entity 156b. The management entities 156a and 156b, the laptop 160a, the cell phone 160b, and the STB 160c may be substantially similar to the corresponding blocks as described with respect to FIG. 1A. Notwithstanding, the invention may not be so limited, and there may be a plurality of service providers and/or content providers without limiting the scope of the invention.

The content provider 152 may comprise suitable logic, circuitry, interfaces and/or code that may be operable to generate and/or provide a plurality of types of content, for example, audio data, video data and/or text data. The content provider 152 may be operable to communicate the received data to one or more endpoint devices, for example, the STB 160c, the laptop 160a and/or the cell phone 160b either directly or indirectly via the service provider 154, for example.

The service provider 154 may comprise suitable logic, circuitry, interfaces and/or code that may be operable to receive data from the content provider 152. The service provider 154 may be operable to communicate the received data to one or more endpoint devices, for example, the STB 160c, the laptop 160a and/or the cell phone 160b. The service provider 154 may be operable to provide access to the Internet and/or one or more private networks via one or more of optical, wired 158a, and/or wireless connections 158b. In various embodiments of the invention, the optical, wired 158a, and/or wireless connections 158b may comprise a broadband connection such as a digital subscriber line (DSL), Ethernet, passive optical network (PON), a T1/E1 line, a cable television infrastructure, a satellite television infrastructure, and/or a satellite broadband Internet connection.

In operation, the management entity 156a and/or 156b may be operable to coordinate operation of one or more endpoint devices, for example, the STB 160c, the cell phone 160b, and/or the laptop 160a. The management entity 156a and/or 156b may be operable to receive one or more user profiles corresponding to one or more endpoint devices, for example, the STB 160c, the cell phone 160b, and/or the laptop 160a. The management entity 156a and/or 156b may be operable to utilize the one or more received user profiles and the usage pattern associated with the one or more endpoint devices, for example, the STB 160c, the cell phone 160b, and/or the laptop 160a to determine leasing information for the one or more endpoint devices, for example, the STB 160c, the cell phone 160b, and/or the laptop 160a. The leasing information may comprise information regarding leasing one or more applications and/or services to the one or more endpoint devices, for example, the STB 160c, the cell phone 160b, and/or the laptop 160a. The one or more endpoint devices, for example, the STB 160c, the cell phone 160b, and/or the laptop 160a may be operable to configure themselves based on receiving, from the management entity 156a and/or 156b, the determined leasing information for each of the one or more endpoint devices.

The management entity 156a and/or 156b may be operable to receive one or more updated user profiles and/or updated usage patterns from the one or more endpoint devices, for example, the STB 160c, the cell phone 160b, and/or the laptop 160a. The management entity 156a and/or 156b may be operable to utilize the one or more updated user profiles and/or the updated usage patterns associated with the one or more endpoint devices, for example, the STB 160c, the cell phone 160b, and/or the laptop 160a to determine new leasing information for the one or more endpoint devices, for example, the STB 160c, the cell phone 160b, and/or the laptop 160a. The management entity 156a and/or 156b may be operable to communicate the determined new leasing information to the one or more endpoint devices, for example, the STB 160c, the cell phone 160b, and/or the laptop 160a. The one or more endpoint devices, for example, the STB 160c, the cell phone 160b, and/or the laptop 160a may be operable to configure themselves based on the received new leasing information from the management entity 156a and/or 156b. The one or more user profiles associated with the particular content type may comprise one or more of applications leased, services leased, a service class, device capabilities, a GNSS location, and/or a power mode of the one or more endpoint devices, for example, the STB 160c, the cell phone 160b, and/or the laptop 160a.

Figure 2A:
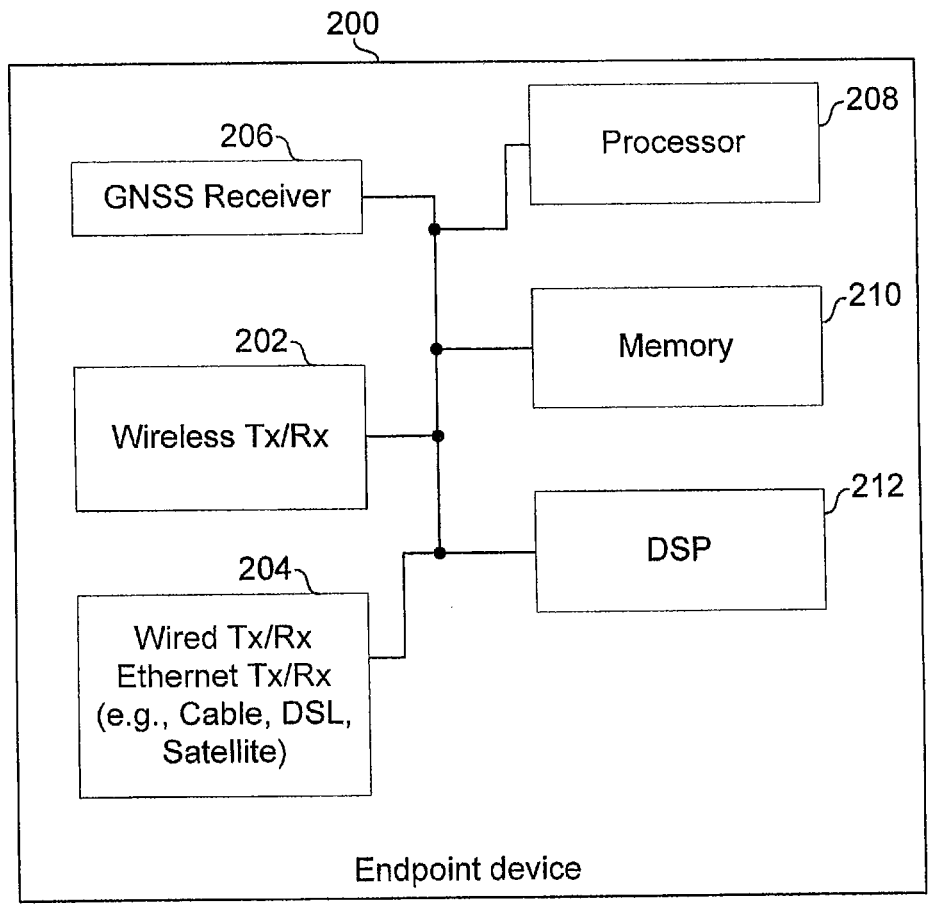
FIG. 2A is a block diagram of an exemplary endpoint device, in accordance with an embodiment of the invention.

FIG. 2A is a block diagram of an exemplary endpoint device, in accordance with an embodiment of the invention. Referring to FIG. 2A, there is shown a endpoint device 200. The endpoint device 200 may comprise a wireless Tx/Rx 202, a wired Tx/Rx 204, a GNSS receiver 206, a processor 208, a memory 210, and a DSP 212. Notwithstanding, the invention may not be so limited, and the endpoint device 200 may be realized in hardware, software, or a combination of hardware and software without limiting the scope of the invention.

The wireless broadband Tx/Rx 202 may comprise suitable logic, circuitry, interfaces and/or code that may be operable to transmit and/or receive data, in adherence with one or more broadband communication standards, to and/or from the service provider 154 and/or the content provider 152 via the wireless connection 158b. The wireless broadband Tx/Rx 202 may be operable to perform amplification, down-conversion, filtering, demodulation, and analog to digital conversion of received signals. In addition, the wireless broadband Tx/Rx 202 may be operable to perform amplification, up-conversion, filtering, modulation, and digital to analog conversion of transmitted signals.

The wired Tx/Rx 204 may comprise suitable logic, circuitry, interfaces and/or code that may be operable to transmit and/or receive data to and/or from the service provider 154 and/or the content provider 152 via the wired connection 158a. For example, the wired Tx/Rx 204 may transmit and/or receive data via a T1/E1 line, Ethernet, PON, DSL, cable television infrastructure, satellite broadband internet connection and/or satellite television infrastructure for example. In various embodiments of the invention, the wired Tx/Rx 204 may be operable to perform exemplary operations and/or functions comprising amplification, down-conversion, filtering, demodulation, and analog to digital conversion of received signals. In addition, the wired Tx/Rx 204 may be operable to perform exemplary operations and/or functions comprising amplification, up-conversion, filtering, modulation, and digital to analog conversion of transmitted signals.

The GNSS receiver 206 may comprise suitable logic, circuitry, interfaces and/or code that may be operable to receive signals from one or more GNSS satellites, for example, GLONASS, GALILEO and/or GPS satellites. The received signals may comprise timing, ephemeris, long term orbit information, and/or almanac information that enable the GNSS receiver 206 to determine its location and/or time.

The processor 208 may comprise suitable logic, circuitry, interfaces and/or code that may be operable to process data and/or control operations of the endpoint device 200. In this regard, the processor 208 may be operable to provide control signals to the various other blocks within the endpoint device 200. The processor 208 may also control data transfers between various portions of the endpoint device 200. Additionally, the processor 208 may enable execution of applications programs and/or code. In various embodiments of the invention, the applications, programs, and/or code may enable, for example, parsing, transcoding and/or otherwise processing of data. The data may comprise multimedia data comprising voice, video, text, still images, and/or moving images. The processor 208 may be operable to communicate one or more user profiles to the management entity 156a and/or 156b. The processor 208 may be operable to receive the determined leasing information from the service provider 154 and/or the content provider 154.

In various embodiments of the invention, the applications, programs, and/or code may be operable to, for example, configure and/or control operation of the wireless Tx/Rx 202 and/or wired Tx/Rx 204 and/or the GNSS receiver 206, the memory 210, and/or the DSP 212.

In accordance with an embodiment of the invention, the endpoint device 200 may be compliant with Energy Efficient Ethernet (EEE). Accordingly, the Ethernet network links may be operable to dynamically enter a lower power state when the Ethernet link is idle, and then be able to transition back to a higher power state running at full speed when there is network activity.

The memory 210 may comprise suitable logic, circuitry, interfaces and/or code that may enable storage or programming of information that comprises, for example, user profiles and/or code that may effectuate the operation of the endpoint device 200. Additionally, the memory 210 may buffer or otherwise store received data and/or data to be transmitted. The memory 210 may be operable to store the leasing information from the service provider 154 and/or the content provider 154.

The DSP 212 may comprise suitable logic, circuitry, interfaces and/or code that may be operable to perform computationally intensive processing of data. The DSP 212 may be operable to handle exemplary operations comprising encoding, decoding, modulating, demodulating, encryption, decryption, scrambling, descrambling, and/or otherwise processing of data.

In operation, the processor 208 may be operable to communicate one or more user profiles corresponding to the endpoint device 200 to the management entity 102. The management entity 102 may be operable to utilize the one or more user profiles associated with the endpoint device 200 and the usage pattern associated with the endpoint device 200 to determine leasing information for the endpoint device 200.

The processor 208 may be operable to configure the endpoint device 200 based on receiving from the management entity 102, the determined leasing information for the endpoint device 200. The processor 208 may be operable to communicate one or more updated user profiles and/or updated usage patterns associated with the endpoint device 200 to the management entity 102. The processor 208 may be operable to configure and/or reconfigure the endpoint device 200 based on receiving existing, default, and/or new leasing information from the management entity 102.

Figure 2B:
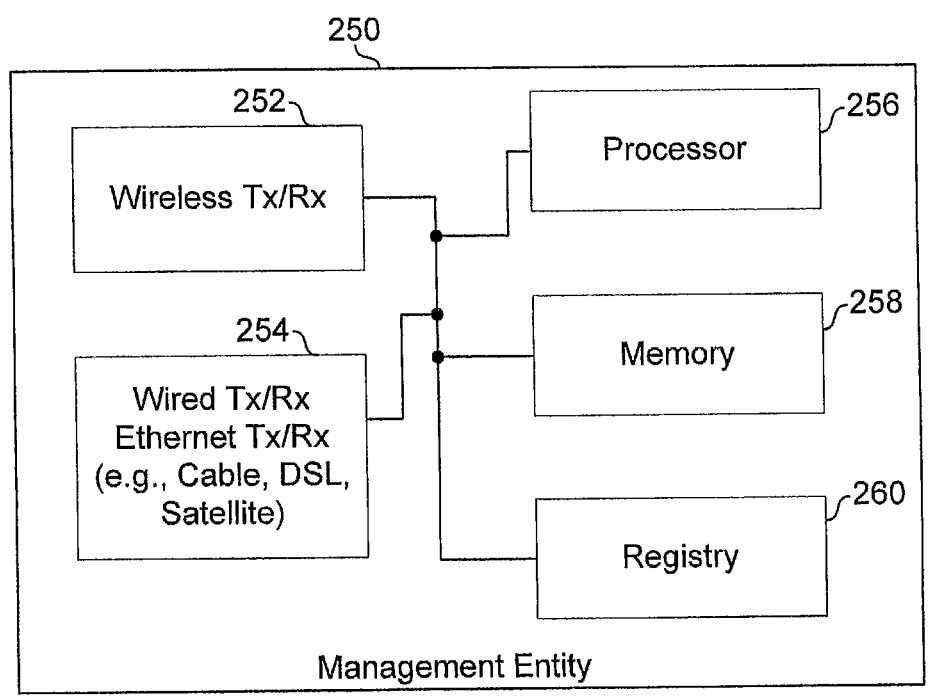
FIG. 2B is a block diagram of an exemplary management entity, in accordance with an embodiment of the invention.

FIG. 2B is a diagram illustrating an exemplary management entity, in accordance with an embodiment of the invention. Referring to FIG. 2B, there is shown a management entity 250. The management entity 250 may comprise a wireless Tx/Rx 252, a wired Tx/Rx 254, a processor 256, a memory 258, and a registry 260. The wireless Tx/Rx 252 and the wired Tx/Rx 254 may be substantially similar to the corresponding blocks as described with respect to FIG. 2A. Notwithstanding, the invention may not be so limited, and the management entity 250 may be realized in hardware, software, or a combination of hardware and software without limiting the scope of the invention.

The processor 256 may comprise suitable logic, circuitry, interfaces and/or code that may be operable to receive one or more user profiles from the endpoint device 200. The processor 256 may be operable to dynamically update a registry 260 based on the received one or more user profiles from the endpoint device 200. The processor 256 may be operable to process data and/or control operations of the management entity 250. In this regard, the processor 256 may be operable to provide control signals to the various other blocks within the management entity 250. The processor 256 may also control data transfers between various portions of the management entity 250. Additionally, the processor 256 may enable execution of applications programs and/or code. In various embodiments of the invention, the applications, programs, and/or code may enable, for example, parsing, transcoding and/or otherwise processing data. The processor 256 may be operable to determine leasing information based on the received one or more user profiles associated with the endpoint device 200 and the usage pattern associated with the endpoint device 200. The processor 256 may be operable to communicate the leasing information to the endpoint device 200.

In various embodiments of the invention, the applications, programs, and/or code may be operable to, for example, configure and/or control operation of the wireless Tx/Rx 252 and/or wired Tx/Rx 254, the memory 258, and/or the registry 260.

The memory 260 may comprise suitable logic, circuitry, interfaces and/or code that may be operable to store or program information that includes, for example, parameters and/or code that may effectuate the operation of the management entity 250. Exemplary parameters may comprise configuration data and exemplary code may comprise operational code such as software and/or firmware, but the information need not be limited in this regard. Additionally, the memory 260 may buffer or otherwise store received data and/or data to be transmitted.

The registry 260 may comprise suitable logic, circuitry, interfaces and/or code that may be operable to store one or more of a bandwidth usage, applications leased, services leased, a service class, device capabilities, a GNSS location, a power mode, a time period of leasing services, and/or a time period of leasing applications of each of the endpoint devices 200.

In operation, the processor 256 may be operable to receive one or more user profiles associated with the endpoint device 200. The processor 256 may be operable to utilize the one or more user profiles associated with the endpoint device 200 and the usage pattern associated with the endpoint device 200 to determine leasing information for the endpoint device 200.

The processor 256 may be operable to communicate the determined leasing information to the endpoint device 200.

The processor 256 may be operable to receive one or more updated user profiles and/or updated usage patterns associated with the endpoint device 200 and update the registry 260. The processor 256 may be operable to determine new leasing information for the endpoint device 200 based on the received updated user profiles and/or updated usage patterns associated with the endpoint device 200. The processor 256 may be operable to communicate the determined new leasing information to the endpoint device 200.

Figure 3:
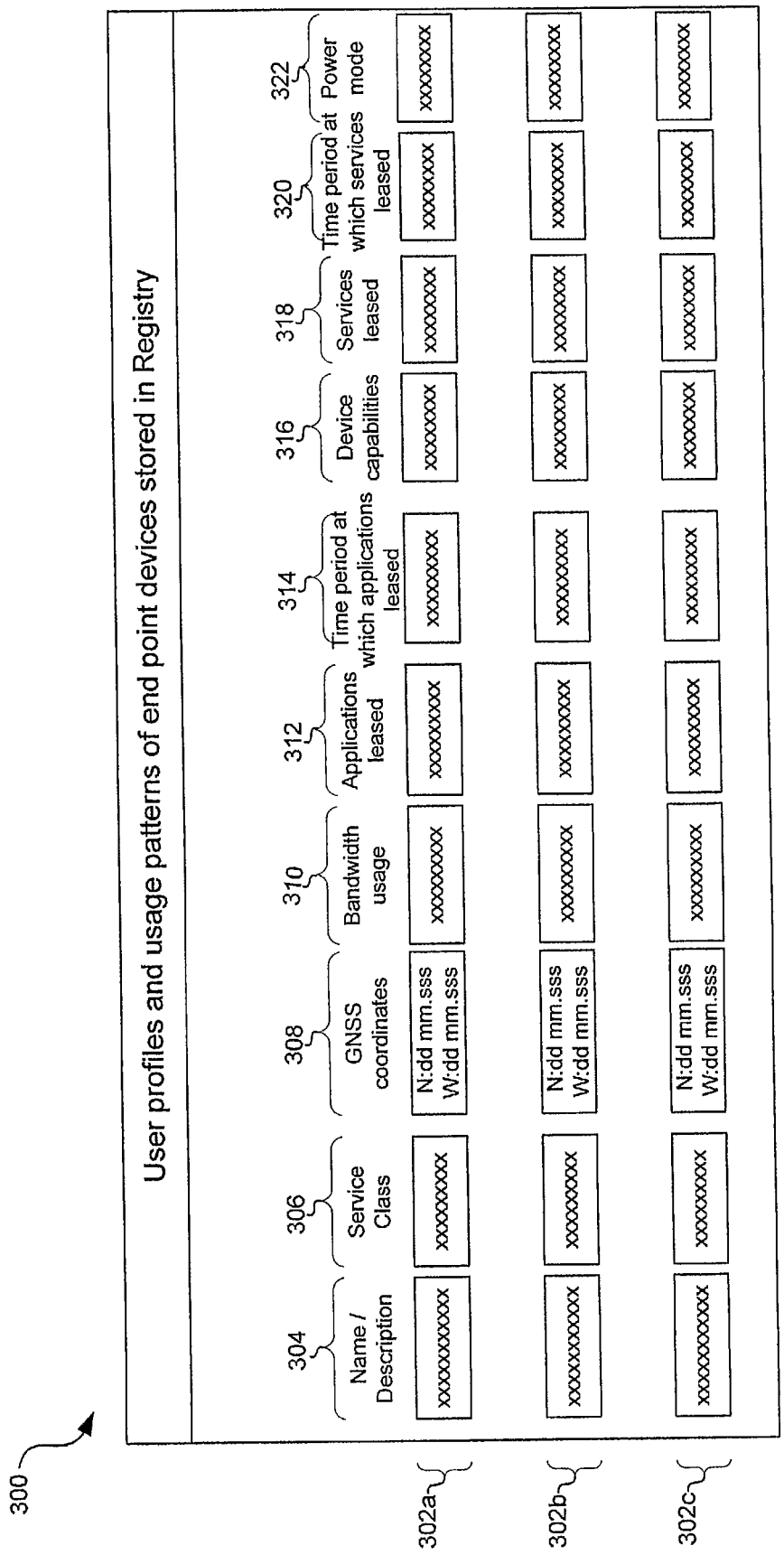
FIG. 3 is a diagram illustrating exemplary user profiles stored in a registry in a management entity, in accordance with an embodiment of the invention.

FIG. 3 is a diagram illustrating exemplary user profiles stored in a registry in a management entity, in accordance with an embodiment of the invention. Referring to FIG. 3, the exemplary user profiles stored in a registry 300 refers to a plurality of endpoint device entries 302a, 302b, and 302c, collectively referred to herein as entries 302. Although only three entries 302 are depicted, the invention may not be so limited and any number of entries may be displayed and/or viewable in the registry 300. Each entry 302 may correspond to user profiles communicated by a particular user and/or endpoint device 200. Each entry 302 may comprise a name/description field 304, a service class 206, a GNSS coordinates field 308, a bandwidth usage field 310, an applications leased field 312, a time period at which applications were leased field 314, a device capabilities field 316, a services leased field 318, a time period at which services were leased field 320, and a power mode field 322 corresponding to an endpoint device 200.

The name/description field 304 may provide information to uniquely describe an endpoint device 200. The service class field 306 may comprise information regarding the designated service class for each endpoint device 200. The GNSS coordinates field 308 may indicate the current GNSS coordinates of an endpoint device 200. The bandwidth usage field 310 may indicate the amount of bandwidth used by the endpoint device 200. The applications leased field 312 may indicate the various applications leased by the endpoint device 200. The applications leased field 312 may also indicate the applications that were downloaded by the endpoint device 200. The time period at which applications were leased field 314 may indicate a time period at which one or more of the applications were leased. The device capabilities field 316 may indicate the device capabilities of the endpoint device, for example, the processor CPU speed, the amount of memory available, and one or more network connections available at the endpoint device 200. The services leased field 318 may indicate the various services leased by the endpoint device 200. The time period at which services were leased field 320 may indicate a time period at which one or more of the services were leased. The power mode field 322 may indicate whether the endpoint device 200 is in a low power mode, or low power idle or a full power mode, for example.

In operation, the plurality of exemplary user profiles and usage patterns stored in the registry 300 may be dynamically updated based on receiving one or more of the user profiles from the endpoint devices 200. The plurality of exemplary user profiles may be communicated to the registry 300 based on a SNMP or L3 protocols, for example. The processor 256 may be operable to determine the leasing information based on the received user profiles and/or the usage patterns associated with the corresponding endpoint device 200. The leasing information may be utilized by the endpoint device 200 to download one or more applications leased at a designated time and/or at a designated location based on the availability of bandwidth, the service class, and the device capabilities of the endpoint device 200.

Figure 4:
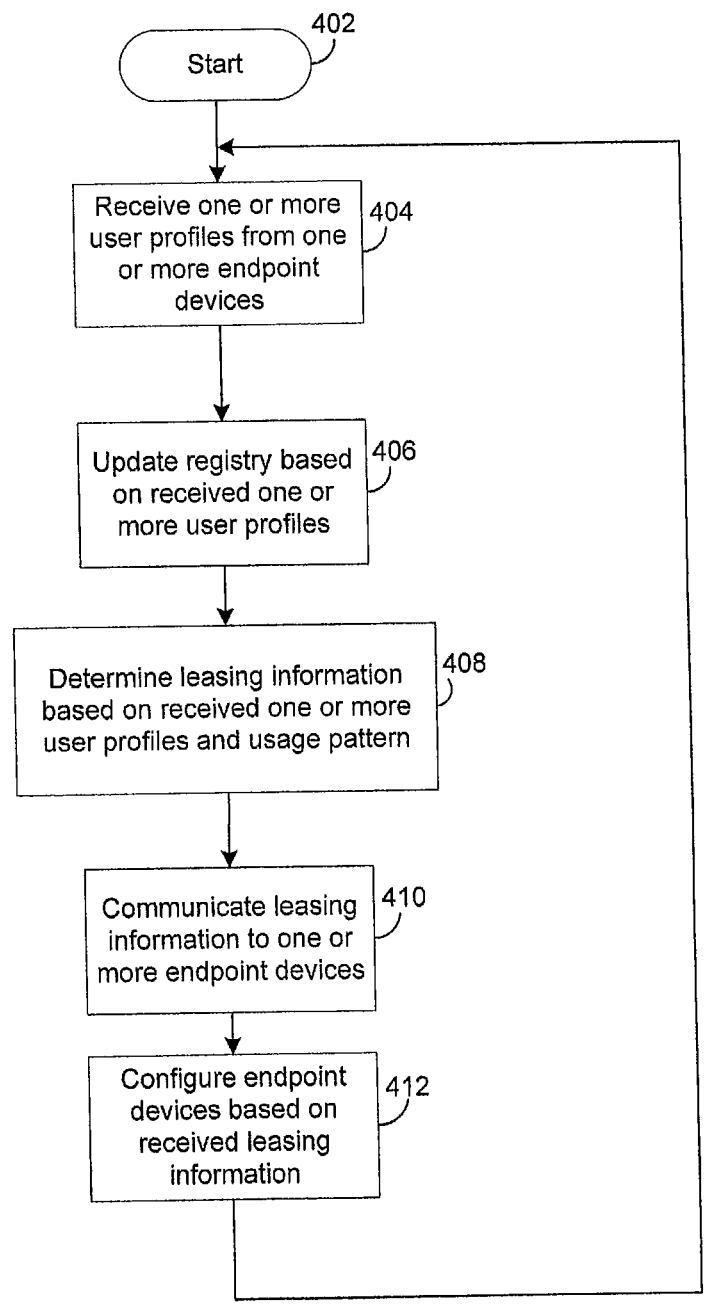
FIG. 4 is a flow chart illustrating exemplary steps for leasing of network services and applications based on a usage pattern, in accordance with an embodiment of the invention.

FIG. 4 is a flow chart illustrating exemplary steps for leasing of network services and applications based on a usage pattern, in accordance with an embodiment of the invention. Referring to FIG. 4, exemplary steps may begin at step 402. In step 404, a management entity 250 may receive one or more user profiles from the endpoint device 200. In step 406, a registry 300 may be dynamically updated based on the received one or more user profiles. In step 408, the management entity 250 may be operable to predict or determine the leasing information based on the received one or more user profiles corresponding to the endpoint device 200 and the usage pattern corresponding to the endpoint device 200. For example, in accordance with an embodiment of the invention, a user may purchase an airline ticket to a destination for a pre-defined time period. The management entity 250 may determine leasing information for the user at the selected destination to lease one or more applications and/or services, such as car rentals or Broadband services, based on the user's profile and the user's usage pattern. Accordingly, the user may have an option to lease one or more applications and/or services for one or more endpoint devices, for example, STBs 110, cell phones 112, and/or the laptops 114 at the destination based on the received leasing information from the management entity 250. In step 410, the endpoint device 200 may be operable to receive the leasing information from the management entity 250. In step 412, the endpoint device 200 may be operable to configure itself based on the received leasing information from the management entity 250. For example, the management entity 250 may be operable to predictively lease a time period for downloading one or more of the applications and/or services accessed by the one or more endpoint devices, for example, the STB 110a, the cell phone 112a, and/or the laptop 114a. Control then returns to step 404.

Figure 5:
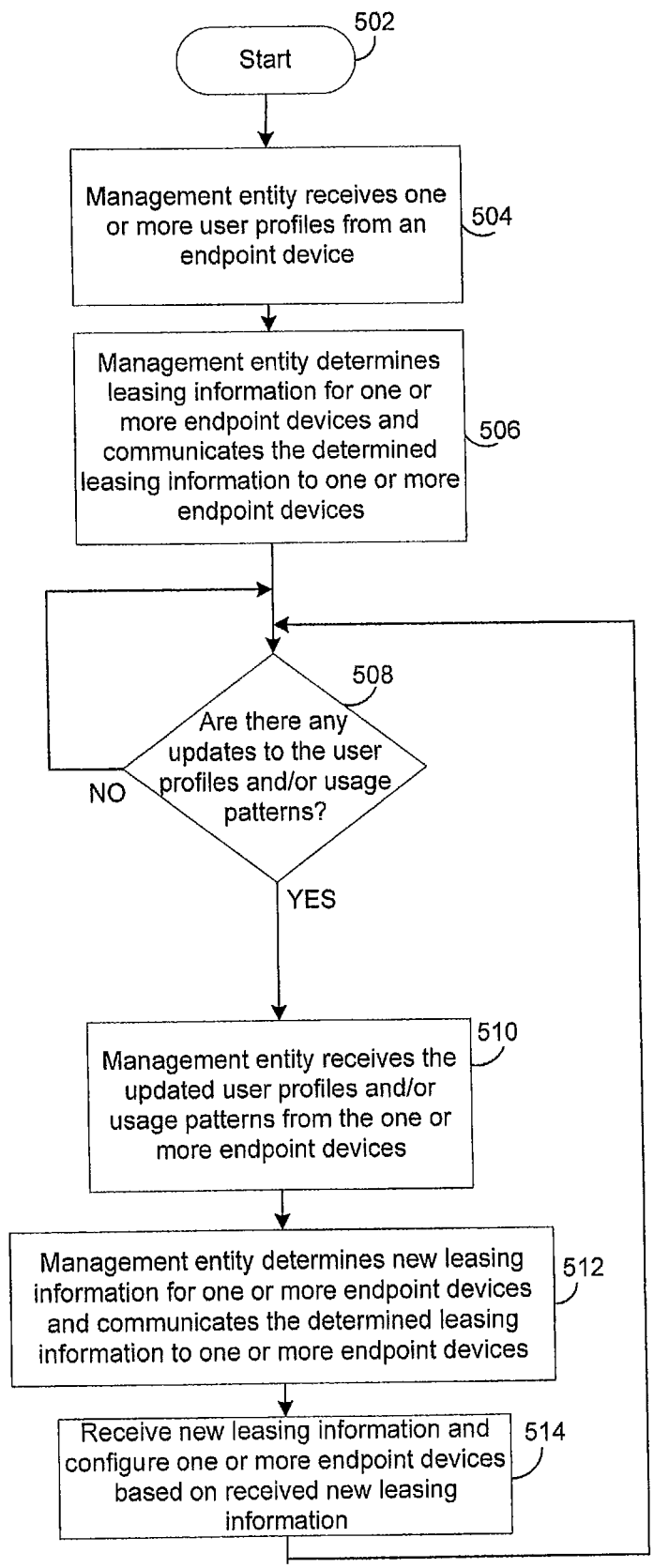
FIG. 5 is a flow chart illustrating exemplary steps for leasing of network services and applications based on an updated usage pattern, in accordance with an embodiment of the invention.

FIG. 5 is a flow chart illustrating exemplary steps for leasing of network services and applications based on an updated usage pattern and/or an updated usage profile, in accordance with an embodiment of the invention. Referring to FIG. 5, exemplary steps may begin at step 502. In step 504, the management entity 250 may receive one or more user profiles from the endpoint device 200. In step 506, the management entity 250 may be operable to utilize the one or more user profiles and the usage pattern associated with the endpoint device 200 to determine leasing information for the endpoint device 200 and communicate the determined leasing information to the endpoint device 200. In step 508, it may be determined whether there are any updates to one or more user profiles and/or usage patterns communicated from the endpoint device 200. In instances where there are no updates to the one or more communicated user profiles and/or usage patterns, control returns to step 508. In instances where there are updates to the one or more communicated user profiles and/or usage patterns, control passes to step 510. In step 510, the management entity 250 may be operable to receive one or more updated user profiles and/or usage patterns from the endpoint device 200. In step 512, the management entity 250 may be operable to determine new leasing information for the endpoint device 200 based on receiving the updated user profiles and/or the updated usage patterns corresponding to the endpoint device 200 and communicate the new leasing information to the endpoint device 200. In step 514, the endpoint device 200 may be operable to receive the new leasing information and configure itself based on the received new leasing information. Control then returns to step 510.

In accordance with an embodiment of the invention, a method and system for leasing network services and applications based on a usage pattern may comprise a communication system 100 (FIG. 1A). The communication system 100 may comprise a management entity 102 (FIG. 1A) that may be operable to coordinate operation of one or more endpoint devices, for example, the STB 110a (FIG. 1A), the cell phone 112a (FIG. 1A), and/or the laptop 114a (FIG. 1A). One or more processors, for example, the processor 256 (FIG. 2B) and/or circuits for use in the management entity 102 may be operable to receive a user profile from the one or more endpoint devices, for example, the STB 110a, the cell phone 112a, and/or the laptop 114a. One or more processors, for example, the processor 256 and/or circuits for use in the management entity 102 may be operable to utilize the received user profile associated with the one or more endpoint devices, for example, the STB 110a, the cell phone 112a, and/or the laptop 114a and a usage pattern associated with the one or more endpoint devices, for example, the STB 110a, the cell phone 112a, and/or the laptop 114a to determine leasing information for the one or more endpoint devices, for example, the STB 110a, the cell phone 112a, and/or the laptop 114a. The leasing information may comprise information regarding leasing one or both of applications and/or services to the one or more endpoint devices, for example, the STB 110a, the cell phone 112a, and/or the laptop 114a.

The usage pattern associated with the one or more endpoint devices may comprise one or more of a bandwidth usage, a time period of leasing applications, and/or a time period of leasing services of the one or more endpoint devices, for example, the STB 110a, the cell phone 112a, and/or the laptop 114a. The determined leasing information may comprise a time period for downloading one or more of the applications leased by the one or more endpoint devices, for example, the STB 110a, the cell phone 112a, and/or the laptop 114a. The determined leasing information may comprise a time period for leasing one or more of the services leased by the one or more endpoint devices, for example, the STB 110a, the cell phone 112a, and/or the laptop 114a. The user profile associated with the one or more endpoint devices, for example, the STB 110a, the cell phone 112a, and/or the laptop 114a may comprise one or more of applications leased, services leased, a service class, capabilities, a GNSS location, and/or a power mode of the one or more endpoint devices, for example, the STB 110a, the cell phone 112a, and/or the laptop 114a.

One or more processors, for example, the processor 256 and/or circuits for use in the management entity 102 may be operable to communicate the determined leasing information to the one or more endpoint devices, for example, the STB 110a, the cell phone 112a, and/or the laptop 114a. One or more processors, for example, the processor 208 (FIG. 2A) and/or circuits may be operable to configure the one or more endpoint devices, for example, the STB 110a, the cell phone 112a, and/or the laptop 114a by utilizing the received determined leasing information for the one or more endpoint devices, for example, the STB 110a, the cell phone 112a, and/or the laptop 114a.

One or more processors, for example, the processor 256 and/or circuits for use in the management entity 102 may be operable to receive an updated user profile and/or an updated usage pattern associated with the one or more endpoint devices, for example, the STB 110a, the cell phone 112a, and/or the laptop 114a. One or more processors, for example, the processor 256 and/or circuits for use in the management entity 102 may be operable to utilize the updated user profile and/or the updated usage pattern associated with the one or more endpoint devices, for example, the STB 110a, the cell phone 112a, and/or the laptop 114a and the usage pattern associated with the one or more endpoint devices, for example, the STB 110a, the cell phone 112a, and/or the laptop 114a to determine new leasing information for the one or more endpoint devices, for example, the STB 110a, the cell phone 112a, and/or the laptop 114a.

One or more processors, for example, the processor 256 and/or circuits for use in the management entity 102 may be operable to communicate the determined new leasing information to the one or more endpoint devices, for example, the STB 110a, the cell phone 112a, and/or the laptop 114a. One or more processors, for example, the processor 208 and/or circuits may be operable to configure the one or more endpoint devices, for example, the STB 110a, the cell phone 112a, and/or the laptop 114a by utilizing the received and determined new leasing information for the one or more endpoint devices, for example, the STB 110a, the cell phone 112a, and/or the laptop 114a.

One or more processors, for example, the processor 256 and/or circuits for use in the management entity 102 may be operable to update the registry 300 (FIG. 3) based on the received user profile associated with the one or more endpoint devices, for example, the STB 110a, the cell phone 112a, and/or the laptop 114a. The registry 300 may comprise one or more of an identification number and a user profile for each of the one or more endpoint devices, for example, the STB 110a, the cell phone 112a, and/or the laptop 114a. One or more processors, for example, the processor 256 and/or circuits for use in the management entity 102 may be operable to receive the user profile and communicate the determined leasing information via one or both of a wireless 158b and/or a wired connection 158a. The management entity 106 may be one or both of a content provider 152 and/or a service provider 154.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for predictive leasing of network services and applications based on a usage pattern.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
at a network management entity,
storing user profile information about applications previously leased and services previously leased by endpoint devices in a network;
storing usage pattern information about respective ones of the endpoint devices in the network;
using the stored user profile information and the stored usage pattern information, determining a leasing arrangement for future leasing of network services or network applications for lease by an endpoint device; and
communicating the leasing arrangement to the endpoint device.

2. The method of claim 1 further comprising:
at the network management entity, receiving from respective endpoint devices respective device user profile information; and
storing in memory the received device user profile information.

3. The method of claim 1 further comprising:
at the network management entity, receiving from respective endpoint devices respective user profile information for users of the respective endpoint devices; and
storing in memory the received user profile information.

4. The method of claim 1 wherein storing user profile information comprises:
storing in a registry data about applications leased by the endpoint devices; and
storing in the registry data about services leased by the endpoint devices.

5. The method of claim 4 wherein storing user profile information comprises:
storing in the registry information defining an application leased by a selected endpoint device;
storing in the registry information defining a service leased by the selected endpoint device; and
storing in the registry information defining device capabilities of the selected endpoint device.

6. The method of claim 5 wherein storing usage pattern information comprises:
storing in the registry information defining time periods at which an application has been leased by the selected endpoint device; and
storing in the registry information defining time periods at which a service has been leased by the selected endpoint device.

7. The method of claim 1 wherein determining a leasing arrangement comprises:
identifying one or more network services to be leased by the endpoint device or a user of the endpoint device; and
identifying one or more network applications to be leased by the endpoint device or a user of the endpoint device.

8. The method of claim 7 wherein determining a leasing arrangement further comprises:
determining a time period for using the one or more network services by the endpoint device or the user of the endpoint device.

9. The method of claim 7 wherein determining a leasing arrangement further comprises:
determining a time period for downloading the one or more network applications by the endpoint device or the user of the endpoint device.

10. The method of claim 1 wherein storing usage pattern information comprises storing information about one or more of bandwidth usage, time periods of leasing applications or time periods of leasing network services by the endpoint devices.

11. The method of claim 1 further comprising:
at the network management entity, receiving updated usage pattern information about respective ones of the endpoint devices in the network;
storing the updated usage pattern information; and
subsequently, using the updated usage pattern information for determining a subsequent leasing arrangement for network services or network applications for lease by the endpoint device.

12. A network management entity comprising:
communication circuitry for communication with remote endpoint devices;
data storage in data communication with the communication circuitry, the data storage configured to store data defining user profiles for the endpoint devices, the user profiles including data about applications previously leased and services previously leased by the endpoint devices, and data defining usage pattern information for usage of the applications previously leased and the services previously leased by the endpoint devices; and
a processor in data communication with the communication circuitry and the data store, the processor operative to use the stored data defining user profiles and the stored data defining usage patterns to determine a leasing arrangement for future usage of network services or network applications for lease by an endpoint device.

13. The network management entity of claim 12 wherein the communication circuitry is operative to receive respective user profile data from respective endpoint devices for storage in the data storage.

14. The network management entity of claim 13 wherein the communication circuitry is operative to receive respective as user profile data one or more of applications leased, services leased, a service class, capabilities, and a location of a respective endpoint device.

15. The network management entity of claim 13 wherein the communication circuitry is further operative to receive updated usage pattern information from the respective endpoint devices for storage in the data storage.

16. The network management entity of claim 12 wherein the communication circuitry is further operative to communicate data defining the leasing arrangement to the endpoint device.

17. Network management entity of claim 12 wherein the processor is operative to determine a time period for downloading one or more network applications as the leasing arrangement.

18. Network management entity of claim 12 wherein the processor is operative to determine a time period for leasing one or more of the services as the leasing arrangement.

19. A method comprising:
at a network management entity in data communication with a plurality of endpoint devices,
receiving over a network user profile data for endpoint devices in the network, the user profile data defining information about applications previously leased and services previously leased by a respective endpoint device, a user of the respective endpoint device, or both;
receiving, over the network, usage pattern data for endpoint devices in the network, the usage pattern data recording past usage of network applications and services by the respective endpoint device in the network;
using the received user profile data and the received usage pattern data, creating respective leasing arrangements for respective endpoint devices, the respective leasing arrangement defining leased network services or leased network applications for future lease by the respective endpoint devices by downloading the leased network services or the leased network applications over the network to the respective endpoint devices;
receiving updated usage pattern data from one of the respective endpoint devices; and
using the updated usage pattern data, updating the leasing arrangement for the one of the respective endpoint devices.

20. The method of claim 19 further comprising:
communicating the leasing arrangement and the updated leasing arrangement to the one of the respective endpoint devices.

* * * * *